US005194309A

United States Patent [19]

Knudsen

[11] Patent Number: 5,194,309

[45] Date of Patent: Mar. 16, 1993

[54] METHOD AND BLANK FOR PRODUCING A SUBSTANTIALLY U-SHAPED GUIDE RAIL IN A WINDOW FRAME GROOVE

[75] Inventor: Rolf Knudsen, Vatne, Norway

[73] Assignee: A/S Spilka Inco Ltd., Alesund, Norway

[21] Appl. No.: 439,196

[22] Filed: Nov. 20, 1989

[30] Foreign Application Priority Data

Nov. 23, 1988 [NO] Norway ................................ 885205

[51] Int. Cl.[5] ............................ B32B 3/02; E04C 3/00

[52] U.S. Cl. ........................................ 428/83; 428/34; 428/45; 428/119; 428/121; 428/130; 428/156; 428/167; 428/192; 428/213; 428/542.8; 49/440; 49/489.1; 49/490.1; 49/492.1; 49/496.1; 52/399; 52/400; 52/403; 52/579; 52/682

[58] Field of Search ................. 49/440, 489, 493, 490, 49/492, 496, 504; 14/73.1; 404/64, 65; 428/156, 83, 167.14, 34, 33, 45, 399, 579, 682, 38, 46, 81, 119, 192, 121, 130, 213, 542.8; 52/399, 579, 682, 171, 273, 349, 403, 400

[56] References Cited

U.S. PATENT DOCUMENTS

| | | | |
|---|---|---|---|
| 1,975,895 | 10/1934 | Geyer | 52/399 |
| 2,821,430 | 1/1958 | Grede | 296/44.5 |
| 4,454,687 | 6/1984 | Baker | 40/419 |
| 4,614,061 | 9/1986 | Brocke | 49/440 |
| 4,648,207 | 3/1987 | Shibasaki | 49/440 |

FOREIGN PATENT DOCUMENTS

| | | |
|---|---|---|
| 1121657 | 4/1982 | Canada . |
| 0862622 | 12/1940 | France . |
| 0132652 | 9/1975 | Norway . |
| 0139573 | 12/1978 | Norway . |
| 0363149 | 5/1970 | Sweden . |
| 0418884 | 9/1979 | Sweden . |
| 0943185 | 12/1963 | United Kingdom . |
| 1512288 | 6/1978 | United Kingdom . |

*Primary Examiner*—Donald J. Loney
*Attorney, Agent, or Firm*—Francis C. Hand

[57] ABSTRACT

A flat web-shaped blank is formed with a pair of parallel recesses, each of which defines an angle of less than 90° to permit the faces of the recess to press against each other when the side sections of the blank are pivoted into a U-shape. The pressing of the lateral faces of the recess against each other serves to bias the side sections away from each other. The flat blank can be wound in a coil for storage and transportation purposes. The blank can be readily shaped into a U-shaped guide rail and inserted into the groove of an associated window frame portion. Shoulders on the outside of the side sections of the blank can snap fit into grooves in the walls of the groove of the window frame portion.

6 Claims, 1 Drawing Sheet

METHOD AND BLANK FOR PRODUCING A SUBSTANTIALLY U-SHAPED GUIDE RAIL IN A WINDOW FRAME GROOVE

The present invention relates to a method of producing slidably hinged, pivot hung windows, in which a substantially U-shaped guide rail is to be provided in a groove formed in the respective window frame portion, said guide rail being made from a web-shaped elastic material which in the transverse direction is substantially flat.

The invention also relates to a blank in the form of a flat web-shaped material for producing a U-shaped guide rail in a groove formed in the respective window frame portion of a slidably hinged, pivot hung window.

The present invention concerns slidably hinged windows which in each of two opposing frame portions are furnished with a guide rail for an associated slide member which provides the connection between the window frame and the respective opposite sides of the casement. Such guide rails are usually each mounted in a freely movable manner in a groove in the respective frame portion. When the frame is finally mounted, each guide rail is secured longitudinally in the groove by means of adjoining frame portions. To prevent the mounted rail from falling out of the groove in the frame, the lateral surfaces of the groove are provided with laterally directed locking grooves for receiving a longitudinal rib or flange projecting laterally from the guide rail. As a result, the guide rail is safely secured in the groove of the frame. The guide rails are usually made of metal, such as aluminium, and as in most extrusion operations, such that the rail can be directly manufactured to its final shape with the necessary profile.

During mounting of the guide rail in a frame portion for a certain type and size of window, the rail is cut off from a standard rail of fixed length. Use is made of rails from a stock containing rails of various standard lengths. Such a stock usually comprises 10–12 different standard lengths of the most current rail lengths. If windows with other frame lengths are to be produced, these rails must be cut down to the desired length. There will thus be a considerable amount of remnants, in case large series of special-type windows of such other frame dimensions are produced, as compared with standard sizes. The large amount of remnants consequently represents a consumption of resources which can be considerable, and thus increases the operational costs. Examples of such solutions for producing frame grooves from rails are besides known from Norwegian patent specifications 139,573 and 132,652, but how the guide rails are made from a blank has not been mentioned.

Besides, the above-mentioned storing of guide rails of various standard lengths generally implies considerable stock and space requirements. Resources are also required for controlling such stock, i.e. for checking that the correct rail lengths are available when needed.

In terms of production, this manner of arranging the stock of rails further implies additional steps in the form of selecting the correct standard rail and supplying this to the actual production line.

U.S. Pat. No. 2,821,430 discloses that a slidable vehicle window can be moved through a U-shaped rail of elastic rubber which is further reinforced with an inner core of perforated metal strip. This blank must, however, be subjected to an extensive pre- and after-treatment in which the blank is, inter alia, covered with felt pads, before the blank is bent and depressed in the groove. The rail is further secured by means of ribs of elastic material which are depressed in the groove and compressed such that their tensional force holds the rail in position. The ribs are further directed outwards and upwards such that sliding out from the groove is rendered difficult. Swedish published application 363,149 also discloses a similar solution in which the slidable vehicle window runs in a flexible rubber moulding. These are certainly satisfactory solutions, when the rubber lining is additionally clamped by the window (in the wound-up state) which runs freely in the groove, but not when only a pin shall run in the groove.

The object of the present invention is to provide an improved method of producing a substantially U-shaped guide rail in the respective window frame portion of a slidably hinged window, such that the production can be simplified and valuable rail material may be prevented from going to waste as remnants.

A further object of the invention is to provide a blank from which a U-shaped guide rail is to be made and which can be more readily stored, and thus to eliminate the present consumption of resources for controlling the stock of rail blanks.

The method according to the present invention is characterised in that the web material is formed into U-shape by mutual bending of side sections which are defined in the web-shaped material by longitudinal weakening grooves or weakening lines which extend in parallel to each other and are preferably formed in the side of the web material which constitutes the rail front face, and that the web material bent to U-shape is inserted in the groove of the respective window frame portion and is secured in the groove by means of a stop member in the form of a longitudinal shoulder which is formed on the rear face of each leg of the U-member, in that the stop members, by means of the inherent resilience of the web material, are caused by snap action to engage corresponding longitudinal abutments in the form of edges formed on the side walls of the groove.

In carrying out the method according to the invention, the rail thus need not be prefabricated in the form of a U-shaped blank, in that the U-shape of the rail is provided only during the actual insertion of the web material in the groove. Moreover, it is not necessary to insert the web material in the groove from the ends of the frame, which up to the present has been the normal way of mounting window frame rails. In contrast hereto, the web member in the method according to the invention is bent and inserted in the groove of the frame along the entire length of the groove. Consequently, it is also possible to mount the U-section after assembly of the frame, which may be required when the window shall be stained or painted after assembly thereof, but prior to insertion of the rail.

In a preferred embodiment of the method according to the invention, use is made of extruded web material which is stored in continuous lengths in wound-up state, e.g. as a coil, and in each individual case, a portion of the web material is cut off directly from the coil, as the web material is to be fitted in the associated groove.

This embodiment of the inventive method brings the great advantage that a coil of the web-shaped material can be incorporated in wound-up state into the production line. This saves storage space, and it will be much easier to automate the actual production.

The blank according to the present invention, in the form of a flat web-shaped material for providing the U-shaped guide rail in the frame portion of the slidably hinged, pivot hung window, is characterised in that the web material comprises an elastic material, such as a polyvinyl chloride plastic, and is formed with weakening grooves or weakening lines extending in parallel to each other and forming longitudinal side sections which by being bent along said weakening grooves/lines are adapted to form the U-shaped rail. The weakening grooves are preferably formed in the side of the web material which constitutes the rail front face, and are preferably of V-shaped cross-section which is closed and exerts an outward pressure as the side sections of the web material are bent. In addition the rear face of each leg of the U-member is recessed at a distance from the longitudinal side edge of the leg, preferably corresponding to half the length of the leg, so as to provide a stop member in the form of a longitudinal shoulder in the web material in order to secure the U-shaped rail by snapping engagement with a corresponding longitudinal edge which is formed on the sides of the groove.

In the above embodiment of the blank or web material, it is no longer necessary to store the rails in U-shape in various sizes, since rails for all window sizes and shapes can now be made from the same web material.

According to a preferred embodiment, the inventive blank is produced by extrusion and stored in wound-up state, for example in the form of a coil. By storing the web material in wound-up state, a large storage space can be set free, since the web material can now be supplied from a single coil, and by the exact cutting of the web material according to the length of the groove in the frame, it is possible to produce the frames with the rails fitted, without any web material going to waste.

BRIEF DESCRIPTION OF THE DRAWINGS

The invention will now be described in detail below, reference being had to the accompanying drawings in which:

FIG. 1 is a perspective view of a window arrangement in which the present invention can be used. The window shown in its open position comprises a casement 11 which is mounted in an associated frame 12. On two opposite sides the casement 11 is similarly connected with the frame 12 by means of pivot fittings 13. The casement 11 can be pivoted from its locked position in that slide pins 13' which are mounted in the uppermost portion of each of the vertical casement portions, can run freely in a respective rail 14 in the vertical frame portions facing the window opening. To open the window, the lower portion of the casement 11 outwards by means of the pivot fitting, and at the same time the slide pins 13' slide downwards in the respective rail 24 in the frame portion. In this manner, the casement 11 can be brought into open position as illustrated.

FIG. 2 is a cross-sectional view of a preferred embodiment of a blank 15 in the form of a flat web-shaped material from which a U-shaped rail 14 is to be produced. The web-shaped blank 15 comprises mainly three coherent sections 16, 17, 18, i.e. a bottom section or central section 17 and two side sections 16, 18, respectively, on each side of the bottom section 17. The thickness of each side section of the blank increases gradually towards the longitudinal side edge, such that the cross-section of each side section almost has the shape of a truncated cone, as indicated by the full and dashed lines in FIG. 2. However, part of the material along the side edge of the lower side of the blank is cut out, as will be described below. In the top face of the web-shaped blank 15, i.e. in the surface which is to constitute the front face of the rail, there are formed rectilinear weakening grooves or lines 20 which extend in parallel to each other and to the longitudinal side edge of the blank. The weakening grooves 20 divide the web-shaped blank 15 into the three sections mentioned above. The weakening grooves 20 in the blank 15 are preferably provided such that the side sections 16, 18 and the bottom section 17 of the blank are largely equally wide. The weakening grooves 20, in form of, for example, U- or V-shaped recesses, are designed such that the side sections can be readily bent along these recesses. If the weakening grooves are triangular or V-shaped in cross-section, the lateral faces preferably make an angle of less than 90° with each other and are optionally made slightly convex in the longitudinal direction in order to increase the inherent resiliency of the side sections, as will be explained below.

Figure 2:
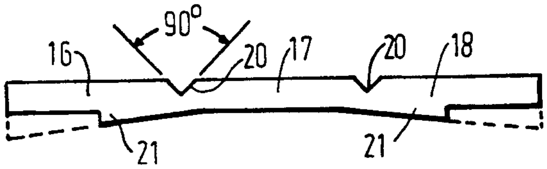
FIG. 2 is a cross-sectional view of the web-shaped rail blank according to the invention.

During production of the blank 15, part of the material (see the dashed portions in FIG. 2) along the side edge of the blank 15 in the under side of each side section 16, 18, i.e. in the part forming the rear face of the U-shaped rail, is removed or cut out at a distance from the longitudinal side edge of the blank, preferably corresponding to half the width of the side section, so as to provide a stop member in the form of a shoulder 21 at a mid-point of the side section 16, 18 for attaching the web material in U-shape to the side wall of the groove. Like the grooves 20 in the front face of the blank, the shoulders 21 of the side sections 16, 18 extend parallel to each other and in the longitudinal direction of the web-shaped blank.

The web-shaped material is made of an elastic material, such as polyvinyl chloride plastic. The PVC material should, however, not be too soft, since the rail 14 shall constitute a sliding surface. The actual production of the blank may be carried out by extrusion. The choice of elastic material and the flat form of the web-shaped blank 15 make the blank well suited for storing in a wound-up state in large continuous lengths as storage coils.

Figure 3:
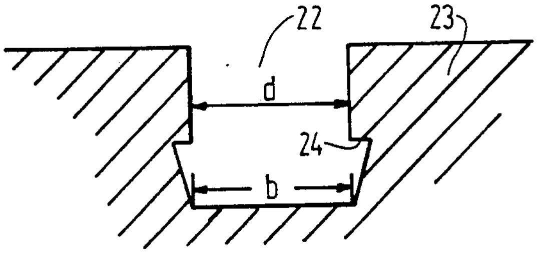
FIG. 3 is a cross-sectional view of a groove formed in a window frame portion.

FIG. 3 is a cross-sectional view of a window frame 23 in which a groove 22 is made in, for example, a milling operation. This groove 22 is adapted to receive the blank 15 and thereby from the rail 14. The outermost parts of the side walls of the groove 22 extend approximately in parallel to each other and perpendicular to the frame surface facing the window opening and are spaced apart a distance which is designated (d). About halfway to the bottom of the groove 22, each side wall is formed with an edge or shoulder 24 in that the groove is here made wider than in its outer portion (where the width is d). The innermost part of the side walls is further inclined such that the lower portion of the groove almost has the form of a truncated cone. The width (b) at the bottom of the groove conforms to the distance (d) between the side walls in the outer portion of the groove.

Figure 4:
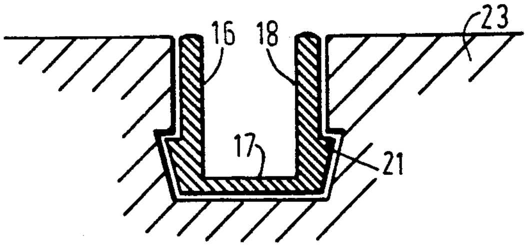
FIG. 4 is a cross-sectional view of a groove in which a U-shaped guide rail is inserted.

FIG. 4 is a cross-sectional view of the position in which the blank 15 in the form of a web material is bent and inserted in the groove so as to provide the rail.

During insertion, the blank 15 is bent along the weakening grooves 20 extending in the front face of the blank such that the side sections 16, 18 are bent upwards. The smallest groove width (d) of the frame 23 and the width (b) of the bottom section 17 of the blank are adapted to each other such that the blank can be inserted into the narrowest portion of the groove having the wall distance (d), without any considerable bending or resistance. It is preferred that the weakening grooves 20 are closed when the side sections are bent, such that the material of the blank consequently is compressed in the area of the weakening grooves 20, and the side sections 16, 18 of the blank are, by their inherent resilience, pressed back (i.e. biased) in the direction of their initial position according to FIG. 2. During such bending, the material of the blank rear section is subjected to tensional forces. The outwardly directed shoulders 21 in the side sections 16, 18 of the rail will thus by snap action engage the corresponding longitudinal edges or shoulders 24 in the groove of the frame. Since the blank is to be bent but once during insertion in the groove of the frame, the web material will not be subjected to such fatigue in the bending area that fracture occurs.

In an alternative embodiment, the U-shaped rail can be glued to the groove. This can be done by applying the necessary amount of adhesive to the side walls and the bottom of the groove immediately before the blank 15 is inserted. Optionally, the rear face of the blank (rail) or the web-shaped member can be coated with the adhesive immediately after extrusion, but before the blank is wound up. The adhesive coating must be covered with a releasable strip which may be easily removed immediately before the blank is formed into a rail during mounting in the groove, as the adhesive adheres more strongly to the web material than to the release strip. Even when an adhesive is used to attach the rail to the groove, the rail and the groove of the frame can be profiled to match one another, as described above, in order to provide the above-mentioned snapping engagement. The use of the adhesive then supplements the above-mentioned snapping attachment.

When adhesive is used, both the side walls of the groove of the frame and the outwardly facing rear sides of the rail can, however, alternatively be substantially flat, i.e. without the correspondingly designed shoulders providing the snapping engagement. In this case, the rail will be reliably attached to the groove by adhesive only.

Figure 5:
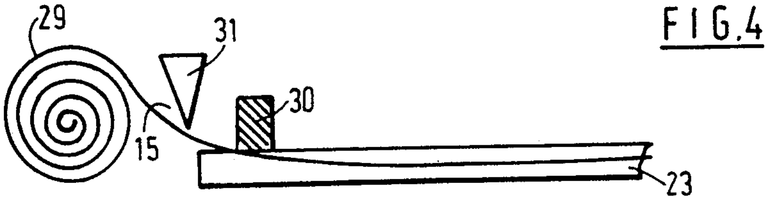
FIG. 5 illustrates schematically how the web-shaped blank can be inserted in a groove according to the inventive method.

FIG. 5 is a schematic view of the positioning of the blank or web material 15 and the frame 23 relative to each other while the method according to the invention is carried out. The web-shaped blank 15 is stored suitably wound up to a coil 29. In serial mounting of rails in frames 23, the web-shaped blank 15 is continuously and automatically unwound from the coil and moved to the right (in the drawing) at the same speed as the frame 23, as indicated by arrows in the Figure. Suitable shaping means 30 may be arranged to carry out the above-mentioned bending of the blank along the weakening grooves 20 and to depress the blank 15 into the groove 22 of the frame 23, the bottom section 17 of the blank constituting the guide member. When the rail is mounted, use is made of a cutting member 31 for cutting the web material to the appropriate length conforming to the length of the frame 13.

On the basis of FIG. 5, the described means can, besides, be operated in various ways in addition to the one described above. For example, the frame 23 can be stationary, while the web material 15 is pulled out to the appropriate length, and the shaping means 30 are advanced along the top face of the frame to bend or insert the blank 15 in the groove to provide the U-shaped rail, whereupon the web material is cut to the appropriate length. Of course, it is also possible to produce the rail after the blank has been cut to the appropriate length.

Figure 6:
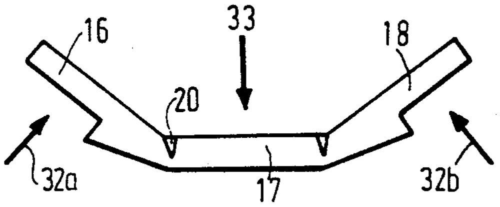
FIG. 6 illustrates schematically the forces which can be exerted upon the blank during bending thereof to provide the U-shaped rail.

The arrows in FIG. 6 indicate the direction of the forces applied by the shaping and mounting means 30 to the side sections 16, 18 and the bottom section 17 of the blank 15, as the method according to the invention is carried out. As appears, two forces 32*a*, 32*b* act to bend the side sections along the weakening grooves 20, and a vertical force 33 acts upon the bottom section 17 to insert the blank in the groove of the frame in order to produce the U-rail. During the actual insertion into the groove, a descending force can of course also act directly upon the edges of the blank side sections 16, 18 in addition to the force 33 exerted on the bottom section.

Figure 1:
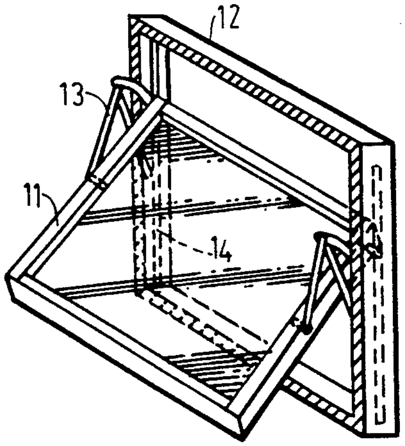
FIG. 1 is a perspective view of a window casement which is pivotably mounted in a window frame.

It should be stressed that the invention is not restricted to the embodiments described above and shown in the drawings. As an alternative solution, it is possible to provide weakening lines in the side of the blank, which is to form the rear side of the rail shown in FIG. 1. Since the material of the blank rear face is subjected to tensional forces during bending, it is consequently sufficient to provide a narrow longitudinal groove parallel to the side edge of the blank. Since moreover there are no weakening grooves in the front face of the blank, the inherent resilience is increased in this manner, whereby the side sections are pressed outwards into snapping engagement with the walls of the groove in the frame.

I claim:

1. A blank for forming a U-shaped guide rail, said blank being made of elastic material and having an elongated flat web-shape of uniform width along the length thereof with a longitudinal central section, a pair of side sections parallel to and extending from opposite sides of said central section, and a pair of recesses parallel to said central section, each said recess being disposed between said central section and a respective side section to permit pivoting of said respective side section into perpendicular relation to said central section to form one wall of a U-shaped guide rail, each recess having lateral faces defining an angle of less than 90° therebetween to permit said faces to press against each other when said side sections are pivotal into a U-shaped guide rail to thereby increase the resiliency of said side sections in a direction away from each other.

2. A blank as set forth in claim 1 wherein each side section is of increasing thickness in a direction transverse to said central section and has a recess in an underside thereof to define a longitudinally extending shoulder.

3. A blank as set forth in claim 2 wherein said shoulder is disposed at a mid-point of said respective side section.

4. In combination, a window frame including a pair of vertical portions, each said vertical portion having a longitudinal groove therein;

a casement pivotally mounted in said frame and having a pair of slide pins, each said pin projecting into a respective groove of said frame; and a pair of U-shaped guide rails of elastic material, each guide rail being disposed in a respective groove of said frame to slidably receive a respective pin therein and including a central section extending along said respective groove and a pair of side sections parallel to and extending along said central section, each said section extending perpendicularly of said central section and being biased outwardly of the other side section against a wall of said respective groove, each rail having a pair of recesses parallel to said central section, each said recess being disposed between said central section and a respective side section to permit pivoting of said respective side section into perpendicular relation to said central section, each recess having lateral faces pressing against each other to bias said side sections away from each other.

5. The combination as set forth in claim 4 wherein each groove in said frame has a pair of parallel walls, each said wall having a shoulder at an intermediate portion thereof and wherein each side section of a respective rail has a shoulder engaging under a respective shoulder of said groove in snap-fitted relation to retain said respective rail in said respective groove.

6. The combination as set forth in claim 4 wherein each rail is made of a resilient plastic.

* * * * *